United States Patent [19]

Maurer

[11] 3,784,916

[45] Jan. 8, 1974

[54] COHERENT PHASE RECEIVER CIRCUIT

[75] Inventor: Robert Maurer, Neureut near Karlsruhe, Germany

[73] Assignee: LICENTIA Patent - Verwaltungs - GmbH, Frankfurt am Main, Germany

[22] Filed: July 21, 1971

[21] Appl. No.: 164,673

[30] Foreign Application Priority Data

July 23, 1970 Germany.................. P 20 36 475.4

[52] U.S. Cl.................. 325/419, 325/485, 307/88.3

[51] Int. Cl.............................................. H03f 7/00

[58] Field of Search..................... 307/88.3; 330/4.5, 330/4.8, 4.9; 325/421, 420, 418, 422, 445, 485

[56] References Cited

UNITED STATES PATENTS

| | | | |
|---|---|---|---|
| 3,217,259 | 11/1965 | Kotzebue et al. | 325/445 X |
| 3,353,099 | 11/1967 | Hayasi et al. | 325/485 X |
| 3,334,299 | 8/1967 | Holzwarth | 325/485 X |

*Primary Examiner*—Benedict V. Safourek
*Attorney*—Spencer & Kaye

[57] ABSTRACT

In a coherent phase receiver circuit consisting of a parametric preamplifier, phase detector, voltage-controlled reference oscillator, control filter and a frequency multiplier, the signal-to-noise ratio of the circuit is improved by constructing the preamplifier to be nonreciprocal, preferably in the form of a chain connection of an upconverter and a downconverter with neutralization of the feedback admittance, and by constructing the multiplier to act as a frequency doubler serving to produce the required pump frequency.

1 Claim, 8 Drawing Figures

COHERENT PHASE RECEIVER CIRCUIT

BACKGROUND OF THE INVENTION

The present invention relates to a coherent phase receiver circuit composed of a parametric preamplifier and a phase detector connected thereto to produce a signal representing the difference between the phase of the input signal of the circuit and the phase of the reference signal of a voltage-controlled oscillator, the difference signal being fed to the oscillator via a control filter to control the output of this oscillator. From this reference oscillator the pump frequency for the parametric preamplifier is derived by frequency multiplication.

FIG. 1 shows such a known receiver circuit as it is employed, for example, in satellite communications systems. The circuit includes a phase detector which enables this circuit to form the difference between the phase of the input signal $U_s$ and the phase of a voltage-controlled oscillator output signal $U_{po}$, the output of the phase detector being returned to the oscillator via a control filter to control the oscillator output signal phase or frequency.

When the phase $\phi_s$ of the input signal coincides with the phase $\phi_{po}$ of the oscillator output reference signal, the control signal $U_r$ disappears at the output of the control filter to establish the stable point of the control system. The voltage-controlled oscillator serves as the fundamental frequency oscillator. The pump frequency signal $U_p$ is derived from the output of this oscillator with the aid of a frequency multiplier and signal $U_p$ is fed to the parametric preamplifier as the pump voltage.

SUMMARY OF THE INVENTION

It is an object of the present invention to further modify this known coherent phase receiver circuit in such a manner as to improve its signal-to-noise ratio, thereby improving its dependability and/or its communications transmission range.

This is accomplished, according to the present invention, in the above-described coherent phase receiver, by making the parametric preamplifier nonreciprocal and supplying it with a pump frequency which is equal to twice the signal frequency, and arranging the frequency multiplier to act as a frequency doubler.

DESCRIPTION OF THE PREFERRED EMBODIMENTS

Figures 1, 2, 3, 4:
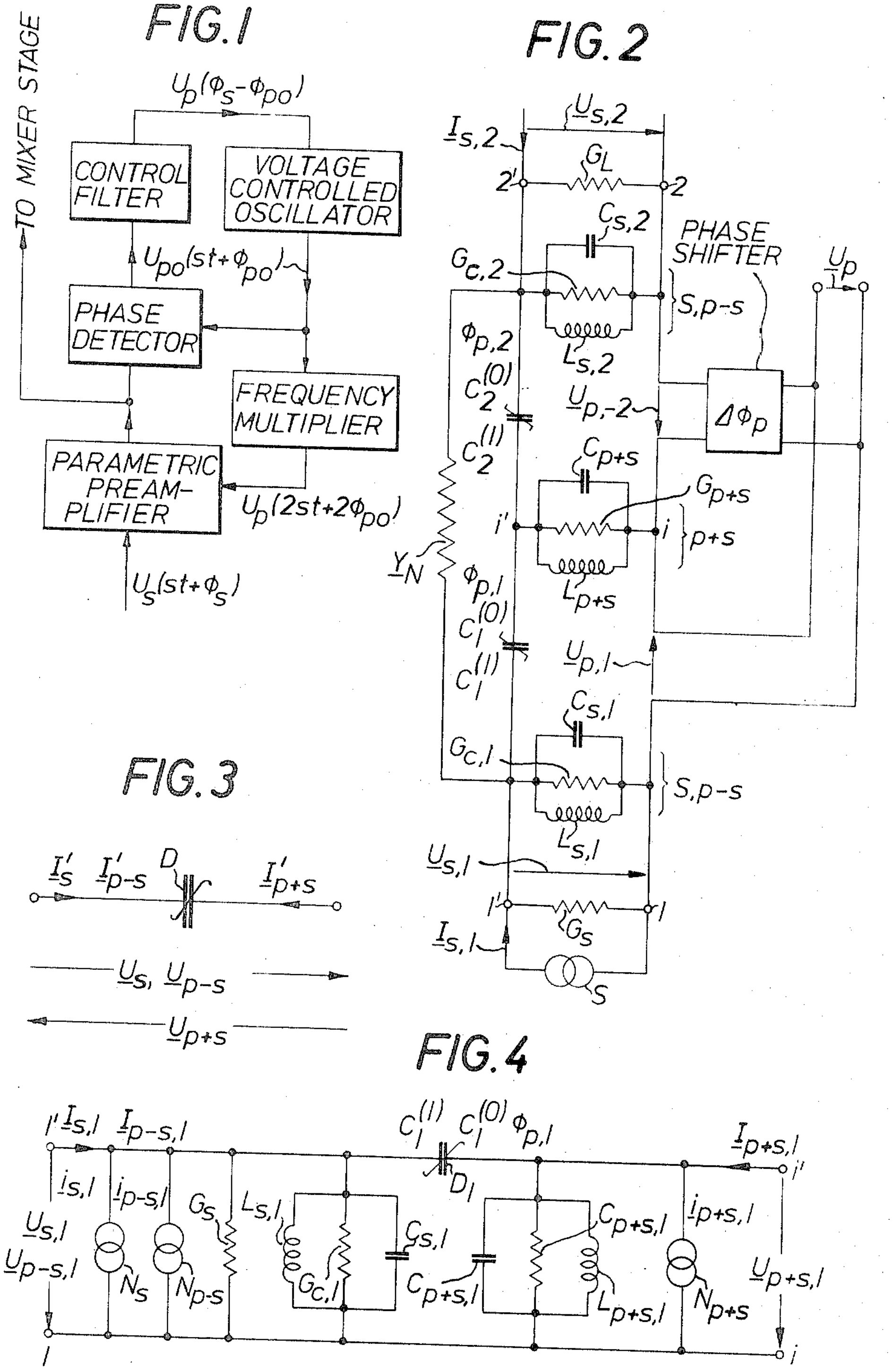
FIG. 1, which has already been described in detail, is a basic block circuit diagram of a known coherent phase receiver with a parametric preamplifier.
FIG. 2 is a schematic circuit diagram of a quasidegenerated or degenerated nonreciprocal parametric preamplifier.
FIG. 3 is a diagram showing the directions of the currents and voltages at the reactance diodes of the parametric preamplifier of FIG. 2.
FIG. 4 is a schematic circuit diagram of an upconverter including noise sources.

In a preferred embodiment of the invention the nonreciprocal parametric preamplifier of the circuit is formed of the chain, or series, connection of an upconverter and a downconverter whose diodes are controlled by different phase signals from a pump source. The feedback admittance of the amplifier, whose total circuitry is shown in FIG. 2, is neutralized.

A calculation of the degree of improvement that can be obtained by the use, according to the present invention, of the above-described nonreciprocal and degenerated parametric preamplifier will now be presented.

The circuit of the quasidegenerated nonreciprocal parametric amplifier

First the circuit of a quasidegenerated nonreciprocal parametric amplifier will be discussed from which the degenerated case can then be derived. FIG. 2 shows the circuit for the amplifier. It contains a signal circuit at the input and the output of the mixer chain, a signal generator S being connected to the input signal circuit and a load $G_L$ being connected to the output signal circuit. When the frequency p-s of the lower sideband, where $p$ is the pump frequency and $s$ the signal frequency, lies in the vicinity of the signal frequency $s$ the signal circuits at the input and output can simultaneously serve for tuning to the frequencies of both the signal and the lower sideband. The connection between the parametric upconverter and downconverter is then formed only by the parallel circuit for the upper sideband $(p+s)$ between terminals $i'$ and $i$. The voltage of the pump frequency p which is to be derived from the reference oscillator with the aid of a frequency multiplier for coherent phase operation is fed to the two reactance diodes $D_1$ and $D_2$, here assumed to be ideal, at different phases via an external phase shifter. For the case where $\Delta\phi=\phi_{p,1}-\phi_{p,2}=\pm(\pi/2)$ is set, the mixer chain, which is then nonreciprocal in phase, can be completely decoupled in the reverse direction by a purely imaginary neutralization characteristic $Y_N$ between the input and output terminals.

The Conversion Matrix of the Quasidegenerated Upconverter or Downconverter, respectively For the current flow directions and voltage polarities shown in FIG. 3 at the ideal reactance diode D, and omitting the terms containing $C^{(2)}$, the following conversion equations apply:

$$\begin{bmatrix} \underline{I}_s' \\ \underline{I}_{p-s}'^{*} \\ \underline{I}_{p+s}' \end{bmatrix} = \begin{bmatrix} jsC^{(0)} & js\underline{C}^{(1)} & -js\underline{C}^{(0)*} \\ -j(p-s)\underline{C}^{(1)*} & -j(p-s)C^{(0)} & 0 \\ -j(p+s)\underline{C}^{(1)} & 0 & j(p+s)C^{(0)} \end{bmatrix} \begin{bmatrix} \underline{U}_s \\ \underline{U}_{p-s}^{*} \\ \underline{U}_{p+s} \end{bmatrix} \quad (2\text{-}1)$$

where:

$I$ = signal current
$i$ = noise current
$U$ = voltage
$\phi$ = phase angle
$C$ = capacitance
$Y$ = admittance $L$ = inductance $G$ = conductance $s$ = signal frequency $p$ = pump frequency $p+s$ = upper sideband frequency $p-s$ = lower sideband frequency $C^{(o)}$ = the base capacitance of a diode $C^{(1)}$ = the first Fourier coefficient of the diode capacitance $*$ = the conjugate of the related complex parameter.

If, as illustrated in FIG. 4, the signal circuits are provided at the input and at the output, as well as uncorrelated noise influxes represented by $N_s$, $N_{p-s}$ and $N_{p+s}$ and caused by the loss characteristics at the frequencies $s$ and $p \pm s$, the following relations $$Y'_s + jsC^{(o)} = Y_s$$

$$Y'_{p\pm s} + j(p\pm s)C^{(o)} = Y_{p\pm s} \qquad (2-2)$$

will lead to the conversion matrix of the quasidegenerated up or down converter, including the noise influxes:

$$\begin{bmatrix} \underline{I}_s \\ \underline{I}^*_{p-s} \\ \underline{I}_{p+s} \end{bmatrix} = \begin{bmatrix} \underline{Y}_s & js\underline{C}^{(1)} & -js\underline{C}^{(1)*} \\ -j(p-s)\underline{C}^{(1)*} & \underline{Y}^*_{p-s} & 0 \\ -j(p+s)\underline{C}^{(1)} & 0 & \underline{Y}_{p+s} \end{bmatrix} \begin{bmatrix} \underline{U}_s \\ \underline{U}^*_{p-s} \\ \underline{U}_{p+s} \end{bmatrix} + \begin{bmatrix} \underline{i}_s \\ \underline{i}^*_{p-s} \\ \underline{i}_{p+s} \end{bmatrix} \qquad (2-3)$$

The Chain Connection of Upconverter and Downconverter

Figure 5:
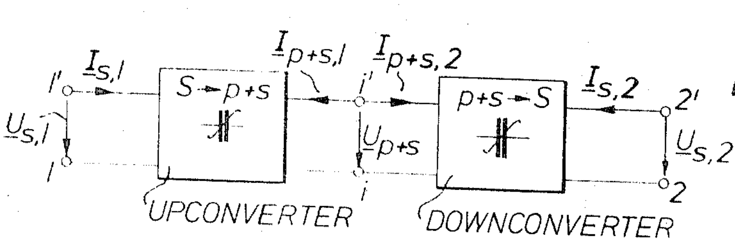
FIG. 5 is a block diagram illustrating a series connection of up and down converters.

With the chain, or series, connection of upconverter and downconverter as shown in FIG. 5 the following conditions exist at terminals $i'$ and $i$:

$$I_{p+s,1} = -I_{p+s,2}$$

$$U_{p+s,1} = U_{p+s,2} = U_{p+s} \qquad (3-1)$$

The currents, voltages and conductances for the upconverter are indicated by the subscript 1 and those of the downconverter with the subscript 2. Equation (2-3) applies for the upconverter as well as for the downconverter.

With the conditions for the chain connection according to Equation (3-1), the third line of Equation (2-3) will be:

$$U_{p+s} = j[(p+s)C_1^{(1)}/Y_{p+s}]U_{s,1} + j[(p+s)C_2^{(1)}/Y_{p+s}]U_{s,2} - [i_{p+s,1} + i_{p+s,2}/Y_{p+s}] \qquad (3-2)$$

where $$Y_{p+s} = Y_{p+s,1} + Y_{p+s,2}$$

For voltages at the lower sideband at the input and output of the amplifier the second line provides for the upconverter or downconverter, respectively, with the condition:

$$I^*_{-p-s,1} = I^*_{-p-s,2} = 0, \text{ that}$$

$$U^*_{p-s,1} = j[(p-s)C_1^{(1)*}/Y^*_{p-s,1}]U_{s,1} - (i^*_{p-s,1}/Y^*_{p-s,1}) \qquad (3-3)$$

$$U^*_{p-s,2} = j[(p-s)C_2^{(1)*}/Y^*_{p-s,2}]U_{s,2} - (i^*_{p-s,2}/Y^*_{p-s,2}) \qquad (3-4)$$

If the voltage $U_{p\pm s}$ is inserted in the first line of Equation (2-3), for the upconverter or downconverter, the four-terminal equations for the unneutralized mixer chain are obtained. These equations are:

$$\underline{I}_{s,1} = \left[\underline{Y}_{s,1} + \frac{s(p+s)|\underline{C}_1^{(1)}|^2}{\underline{Y}_{p+s}} - \frac{s(p-s)|\underline{C}_1^{(1)}|^2}{\underline{Y}^*_{p-s,1}}\right]\underline{U}_{s,1} + \frac{s(p+s)\underline{C}_1^{(1)*}\underline{C}_2^{(1)}}{\underline{Y}_{p+s}}\underline{U}_{s,2} + \underline{i}_{s,1} + j\frac{s\underline{C}_1^{(1)*}}{\underline{Y}_{p+s}}[\underline{i}_{p+s,1} + \underline{i}_{p+s,2}] - j\frac{s\underline{C}_1^{(1)}}{\underline{Y}^*_{p-s,1}}\underline{i}^*_{p-s,1} \qquad (3-5)$$

$$\underline{I}_{s,2} = \frac{s(p+s)\underline{C}_2^{(1)*}\underline{C}_1^{(1)}}{\underline{Y}_{p+s}}\underline{U}_{s,1} + \left[\underline{Y}_{s,2} + \frac{s(p+s)|\underline{C}_2^{(1)}|^2}{\underline{Y}_{p+s}} - \frac{s(p-s)|\underline{C}_2^{(1)}|^2}{\underline{Y}^*_{p-s,2}}\right]\underline{U}_{s,2} + \underline{i}_{s,2} + j\frac{s\underline{C}_2^{(1)*}}{\underline{Y}_{p+s}}[\underline{i}_{p+s,1} + \underline{i}_{p+s,2}] - j\frac{s\underline{C}_2^{(1)}}{\underline{Y}^*_{p-s,2}}\underline{i}^*_{p-s,2} \qquad (3-6)$$

The Signal Characteristics of the Neutralized Quasidegenerated Amplifier

Figure 6:
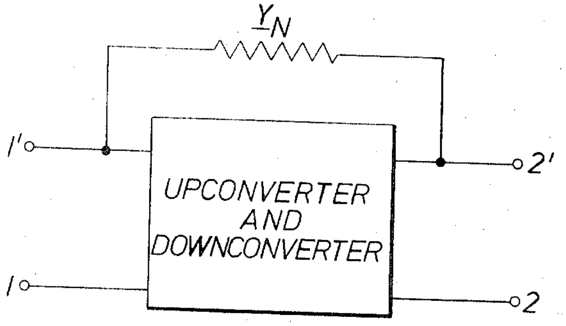
FIG. 6 is a block diagram of an arrangement for the neutralization of the series circuit of FIG. 5.

The signal characteristics of the quasidegenerated amplifier are obtained with the aid of the standard four-terminal relations, with neutralization achieved in the manner shown in FIG. 6 from Equations (3-5) and (3-6) for the noise-free case $i_S, i_{p\pm s} = 0$, as follows:

$$Y_{11} = Y_{s,1} + jY_N + [s(p+s)\,|C_1^{(1)}|^2/Y_{p+s,1}] - [s(p-s)\,|C_1^{(1)}|^2/Y^*_{p-s,1}] \qquad (4-1)$$

$$Y_{22} = Y_{s,2} + jY_N + s(p+s)\,|C_2^{(1)}|^2/Y_{p+s}] - [s(p-s)\,|C_2^{(1)}|^2/Y^*_{p-s,2}]$$

$$Y_{12} = [s(p+s)C_1^{(1)*}C_2^{(1)}/Y_{p+s}] - jY_N \qquad (4-1)$$

$$Y_{21} = [s(p+s)C_2^{(1)*}C_1^{(1)}/Y_{p+s}] - jY_N$$

At resonance and with $C_1^{(1)} = |C_1^{(1)}|\,e^{j\phi_{p,1}}$, $C_2^{(1)} = |C_2^{(1)}|\,e^{j\phi_{p,2}}$, $|C_1^{(1)}| = |C_2^{(1)}|$; $\Delta\phi_p = \phi_{p,1} - \phi_{p,2} = -(\pi/2)$ as well as the identities $$G_D = s(p+s)\,|C^{(1)}|^2/G_{p+s} \qquad (4-2)$$

$$G_{p-s,1} = G_2 + G_{C,1} + G_D \qquad (4-3) \text{ and}$$

$$G_{p-s,2} = G_L + G_{C,2} + G_D \qquad (4-4)$$

where the subscript D relates to a reactance diode parameter, the following equations are derived from Equations (4-1) for the quasidegenerated case $s \approx p-s$:

$$I_{s,1} = [\,G_s + G_{C,1} + G_D - (s^2|C^{(1)}|^2/G_s + G_{C,1} + G_D)]\,U_{s,1} + j\,[G_D - Y_N]\,U_{s,2}$$

$$I_{s,2} = -j\,[G_D + Y_N]\,U_{s,1} + [G_L + G_{C,2} + G_D - (s^2\,|C^{(1)}|^2/G_L + G_{C,2} + G_D]U_{s,2} \qquad (4-5)$$

According to Equation (4-5) complete decoupling is obtained in the reverse direction for $G_D = Y_N$. For this case, equation (4-5) with $G_s = G_L$ $G_{C,1} = G_{C,2} = G_C$ and the abbreviation:

$$\beta - s\,|C^{(1)}|\,/G_s + G_C + G_D \qquad (4-6)$$

leads to the following equation:

$$I_{s,1} = [G_s + G_C + G_D]\;[1-\beta^2]\;U_{s,1}$$

$$I_{s,2} = -j2G_D U_{s,1} + [G_s + G_C + G_D]\;[1-\beta^2]\;U_{s,2} \qquad (4-7)$$

The transmission Gain of the Quasidegenerated Amplifier

The transmission gain of the amplifier in the forward direction is given by the ratio of the output at the load impedance and the available output of the signal generator. Generally one obtains:

$$L_{uv} = 4G_sG_L\;|\,(U_{s,2}/I_{s,1})|^2 \qquad (4-8)$$

which is expressed in terms of four-terminal constants:

$$L_{uv} = 4G_sG_L|Y_{21}|^2/|Y_{11}Y_{22} - Y_{12}Y_{21}|^2 \qquad (4-9)$$

For the neutralized quasidegenerated amplifier one then obtains the following transmission gain with the four terminal constants of Equation (4-7):

$$L_{uvquasi} = 16\;G^2_s\;G^2_D/(G_s + G_C + G_D)^4(1-\beta^2)^4 \qquad (4-10)$$

The transmission gain in the reverse direction results accordingly in the following manner corresponding to Equation (4–9):

$$L_{ur}=4G_sG_L(U_{s,1}/I_{s,2}) = 4\, G_sG_L|Y_{12}|^2/|Y_{11}\, Y_{22} - Y_{12}\, Y_{21}|^2 \qquad (4\text{–}11)$$

Because $G_D = Y_N$, i.e. $Y_{12} = 0$; $L_{ur} = 0$.

The Noise Characteristics of the Quasidegenerated Amplifier

To calculate the noise influxes at the input and output of the quasidegenerated amplifier, $U_{s,1}=U_{s,2}=0$ is used in Equations (3–5) and (3–6) to yield:

$$\underline{i}_1=\underline{i}_{s,1}+j\frac{sC_1^{(1)*}}{\underline{Y}_{p+s}}[\underline{i}_{p+s,1}+\underline{i}_{p+s,2}]-j\frac{sC_1^{(1)}}{\underline{Y}^*_{p-s,1}}\underline{i}^*_{p-s,1} \qquad (5\text{–}1)$$

$$\underline{i}_2=\underline{i}_{s,2}+j\frac{sC_2^{(1)*}}{\underline{Y}_{p+s}}[\underline{i}_{p+s,1}+\underline{i}_{p+s,2}]-j\frac{sC_2^{(1)}}{\underline{Y}^*_{p-s,2}}\underline{i}^*_{p-s,2} \qquad (5\text{–}2)$$

Figure 7:
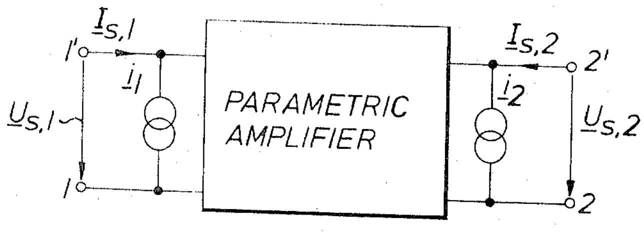
FIG. 7 is a block representation of an entire four-terminal amplifier according to the invention with a representation of the noise influx at its input and output.
Figure 8:
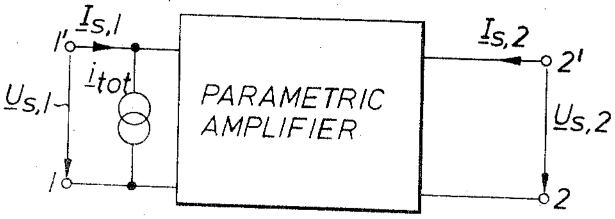
FIG. 8 is a block representation of a four-terminal amplifier according to the invention with the total noise influx at its input.

The following relationships apply for the circuit of FIG. 7:

$$I_{s,1}=Y_{11}U_{s,1}+Y_{12}\,U_{s,2}+i_1$$
$$I_{s,2}=Y_{21}\,U_{s,1}+Y_{22}\,U_{s,2}+i_2 \qquad (5\text{–}3)$$

from which the resulting total noise influx at the input of the amplifier can be derived:

$$i_{tot}=i_1-(Y_{11}/Y_{21})\,i_2 \qquad (5\text{–}4)$$

for which now for the arrangement of FIG. 8 the following equations apply:

$$I_{s,1}=Y_{11}U_{s,1}+Y_{12}\,U_{s,2}+i_{tot}$$
$$I_{s,2}=Y_{21}\,U_{s,1}+Y_{22}\,U_{s,2} \qquad (5,\text{–}5)$$

For $i_{tot}$ it thus follows from Equations (5–1) and (5–2):

$$\underline{i}_{tot}=\underline{i}_{s,1}-\frac{\underline{Y}_{11}}{\underline{Y}_{21}}\underline{i}_{s,2}-j\frac{sC_1^{(1)}}{\underline{Y}^*_{p-s,1}}\underline{i}^*_{p-s,1}+\frac{\underline{Y}_{11}}{\underline{Y}_{21}}j\frac{sC_2^{(1)}}{\underline{Y}^*_{p-s,2}}\underline{i}^*_{p-s,2}+j\frac{sC_1^{(1)*}}{\underline{Y}_{p+s}}\left[1-\frac{\underline{Y}_{11}}{\underline{Y}_{21}}\frac{C_2^{(1)*}}{C_1^{(1)*}}\right][\underline{i}_{p+s,1}+\underline{i}_{p+s,2}] \qquad (5\text{–}6)$$

and thus for the average value of the square of the total noise current with resonance tuning of the amplifier:

$$\overline{|\underline{i}_{tot}|^2}=\overline{|\underline{i}_{s,1}|^2}+\left|\frac{\underline{Y}_{11}}{\underline{Y}_{21}}\right|^2\overline{|\underline{i}_{s,2}|^2}+\frac{s^2|C_1^{(1)}|^2}{G^2_{p-s,1}}\overline{|\underline{i}^*_{p-s,1}|^2}+\left|\frac{\underline{Y}_{11}}{\underline{Y}_{21}}\right|^2\frac{s^2|C_2^{(1)}|^2}{G^2_{p-s,2}}\overline{|\underline{i}^*_{p-s,2}|^2}+\frac{s^2|C_1^{(1)}|^2}{G^2_{p+s}}\left|\left[1-\frac{\underline{Y}_{11}}{\underline{Y}_{21}}\frac{C_2^{(1)*}}{C_1^{(1)*}}\right]\right|^2\overline{|\underline{i}_{p+s,1}+\underline{i}_{p+s,2}|^2}. \qquad (5\text{–}7)$$

The average values of the squares of the noise currents of Equation (5–7) are given by the Nyquist relationships:

$$\overline{|\underline{i}_{s,1}|^2}=4KT(G_s+G_{c,1})\Delta f;\quad \overline{|\underline{i}_{s,2}|^2}=4KTG_{c,2}\Delta f$$
$$\overline{|\underline{i}^*_{p-s,1}|^2}=4KT(G_s+G_{c,1})\Delta f;\quad \overline{|\underline{i}^*_{p-s,2}|^2}=4KTG_{c,2}\Delta f$$
$$\overline{|\underline{i}_{p+s,1}|^2}=4KTG_{p+s,1}\Delta f;\quad \overline{|\underline{i}_{p+s,2}|^2}=4KTG_{p+s,2}\Delta f$$

or, $$\overline{|\underline{i}_{p+s,1}+\underline{i}_{p+s,2}|^2}=4KTG_{p+s}\Delta f. \qquad (5\text{–}8)$$

With the conditions $|C_1^{(1)}|=|C_2^{(1)}|$, $\phi_{p,1}-\phi_{p,2}=-(\pi/2)$, $G_{p+s,1}+G_{p+s,2}$, $G_{p-s,1}=G_{p-s,2}=G_s+G_C+G_D$ and the relationships:

$$(Y_{11}/Y_{21})^*(C_2^{(1)*}/C_1^{(1)})=(G_s+G_C+G_D)\,(1-\beta^2)/2G_D$$
$$s^2|C^{(1)}|^2/G^2_{p+s}=G_D/G_{p+s}\cdot s/p+s \qquad (5\text{–}9)$$

as well as $\beta$ according to Equation (4–6), one obtains:

$$\frac{\overline{|\underline{i}_{tot}|^2}}{4KT\Delta f}=G_s+G_{c,1}+\frac{(G_s+G_C+G_D)^2(1-\beta^2)^2}{4G_D^2}G_{C,2}+\beta^2(G_s+G_{C,1})+\frac{(G_s+G_C+G_D)^2(1-\beta^2)^2}{4G_D^2}\beta^2G_{C,2}+\frac{s}{p+s}G_D\left[1-\frac{(G_s+G_C+G_D)(1-\beta^2)}{2G_D}\right]^2 \qquad (5\text{–}10)$$

The noise factor F of the quasidegenerated amplifier then becomes, based on the square of the noise current of the signal source $|\overline{I_s}|^2=4KTG_s\Delta f$, the reference value:

$$F=\frac{\overline{\underline{i}_{tot}^{\,2}}}{\overline{\underline{i}_s^{\,2}}}=\left[1+\frac{G_C}{G_s}\right][1+\beta^2]+\frac{(G_s+G_D+G_C)^2(1-\beta^2)^2}{4G_D^2}(1+\beta^2)\frac{G_C}{G_s}+\frac{1}{3}\frac{G_D}{G_s}\left[1-\frac{(G_s+G_C+G_D)(1-\beta^2)}{2G_D}\right]^2 \qquad (5\text{–}11)$$

When the signal circuit losses $G_{C,1}=G_{C,2}=O$ are neglected, Equation (5–11) reduces to the simple relationship:

$$F=1+\beta^2+\frac{1}{3}\frac{G_D}{G_s}\left[1-\frac{1}{2}\left(1+\frac{G_s}{G_D}\right)(1-\beta^2)\right]^2; \qquad (5\text{–}12)$$

which takes the value $F\approx 2 \;\hat{=}\; 3$db for high amplification $\beta\rightarrow 1$ and $G_D < G_s$.

The Conversion Matrix of the Degenerated Up or Down Converter

Compared to the quasidegenerated case where $s\approx p-s$ and the signal voltages $U_s$, $U_{p-s}$, $U_{p+s}$ control the nonlinear element, the following applies in the degenerated case:

$$s=p-s \text{ or } p=2s$$
$$U_s=U_{p-s} \text{ and } U_{p+s}=U_{3s} \qquad (6\text{–}1)$$

For the noisefree case with $i_s=i_{p+s}=0$ the conversion Equations (2–3) are thus as follows for the degenerated up and down converter, respectively:

$$I_s=Y_sU_s+jsC^{(1)}U_s^*-jsC^{(1)*}U_{3s}$$
$$I_{3s}=-j3sC^{(1)}\,U_s+Y_{3s}\,U_{3s} \qquad (6\text{–}2)$$

The Chain Connection of Up and Down Converters for the Degenerated Case

For the chain connection of the degenerated up and down converter the conditions of Equation (3–1) again apply, so that the following four-terminal equations result for a development corresponding to that employed in connection with Equations (3):

$$\underline{I}_{s,1}=\left[\underline{Y}_{s,1}+\frac{3s^2|\underline{C}_1^{(1)}|^2}{\underline{Y}_{3s}}+js\underline{C}_1^{(1)}\frac{\underline{U}^*_{s,1}}{\underline{U}_{s,1}}\right]\underline{U}_{s,1}\;1+\frac{3s^2\underline{C}^{(1)*}\underline{C}_2^{(1)}}{\underline{Y}_{3s}}\underline{U}_{s,2}$$
$$\underline{I}_{s,2}=\frac{3s^2\underline{C}_2^{(1)*}\underline{C}_1^{(1)}}{\underline{Y}_{3s}}\underline{U}_{s,1}+\left[\underline{Y}_{s,2}+\frac{3s^2|\underline{C}_2^{(1)}|^2}{\underline{Y}_{3s}}+js\underline{C}_2^{(1)}\frac{\underline{U}^*_{s,2}}{\underline{U}_{s,2}}\right]\underline{U}_{s,2} \qquad (6\text{–}3)$$

With $$\frac{U^*_{s,1}}{U_{s,1}}=e^{-j2\phi_{s,1}};\ \frac{U_{s,2}}{U_{s,2}}=e^{-j2\phi_{s,2}};\ C_1^{(1)}=|C_1^{(1)}|e^{j\phi_{p,1}};\ C_2^{(1)}=|C_2^{(1)}|e^{j\phi_{p,2}};\ |C_1^{(1)}|=|C_2^{(1)}|$$

and $G_D$ according to Equation (4–2), Equation (6–3) will provide, with resonance tuning of $Y_s$, 1; $Y_{s,2}$ and $Y_{3s}$:

$$I_{s,1}=\left[G_s+G_{c,1}+G_D-s|C^{(1)}|e^{j\left(\phi_{p,1}-\frac{\pi}{2}-2\phi_{s,1}\right)}\right]U_{s,1}+G_De^{-j(\phi_{p,1}-\phi_{p,2})}U_{s,2}$$

$$I_{s,2}=G_De^{j(\phi_{p,1}-\phi_{p,2})}U_{s,1}+\left[G_L+G_{C,2}+G_D-s|C^{(1)}|e^{j\left(\phi_{p,2}-\frac{\pi}{2}-2\phi_{s,2}\right)}\right]U_{s,2} \qquad (6\text{–}4)$$

If $\phi_{p,1}-\phi_{p,2}=-(\pi/2)$ is set again and the converter chain is neutralized with the purely imaginary conductance value $Y_N$ according to FIG. 6, Equations (6–4) will result in the following, with resonance tuning and neutralization with $G_D=Y_N$:

$$I_{s,1}=\left[G_s+G_{C,1}+G_D-s|C^{(1)}|e^{j\left(\phi_{p,1}-\frac{\pi}{1}-2\phi_{s,1}\right)}\right]U_{s,1}$$

$$I_{s,2}=-j2G_DU_{s,1}+[G_L+G_{C,2}+G_D-s|C^{(1)}|e^{j(\phi_{p,1}-2\phi_{s,2})}]U_{s,2} \qquad (6\text{–}5)$$

The maximum negative conductance value at the input of the amplifier is obtained with the phase condition:

$$\phi_{p,1}=2\phi_{s,1}+(\pi/2) \qquad (6\text{–}6)$$

and thus, because $I_{s,2}=0$, from the second line of Equation (6–5):

$$2G_D|U_{s,1}|e^{j\left(\phi_{s,1}+\frac{\pi}{2}\right)}=\left[G_L+G_{C,2}+G_D-s|C^{(1)}|e^{j2\left(\phi_{s,1}-\phi_{s,2}+\frac{\pi}{4}\right)}\right]\cdot|U_{s,2}|e^{j\phi_{s,2}}$$

or, $$\frac{2G_D|U_{s,1}|}{(G_L+G_{C,2}+G_D)|U_{s,2}|}=e^{j\left(\phi_{s,2}-\phi_{s,1}-\frac{\pi}{2}\right)}-\frac{s|C^{(1)}|}{G_L+G_{C,2}+G_D}e^{-j(\phi_{s,1}-\phi_{s,1})}$$

the condition $$(\phi_{s,2}-\phi_{s,1})=\frac{s|C^{(1)}|}{G_L+G_{C,2}+G_D} \qquad (6\text{–}7)$$

which, for $G_5=G_L$ and $G_{C,1}=G_{C,2}=G_C$ with $\beta$ according to Equation (4–6), takes the following value:

$$\phi_{s,2}-\phi_{s,1}=\text{arc cotg}\beta \qquad (6\text{–}8)$$

For high amplification with $\beta\to1$ Equation (6–8) yields:

$$\phi_{s,2}=\phi_{s,1}+(\pi/4) \qquad (6\text{–}9)$$

In this case the negative conductance value at the output of the amplifier also reaches its maximum value. With the phase conditions according to Equations (6—6) and (6–8), as well as for $G_s=G_L$ and $G_{D,1}=G_{C,2}=G_C$, the following result from Equations (6–5):

$$I_{s,1}=G_s+G_C+G_D][1-\beta]U_{s,1}$$

$$I_{s,2}=-j2G_DU_{s,1}+[G_s+G_C+G_D]\left[1-\beta e^{-j2\left(\text{arc cotg}\beta-\frac{\pi}{4}\right)}\right]U_{s,2} \qquad (6\text{-}10)$$

The Transmission Gain of the Degenerated Amplifier

With the aid of the four-terminal constants from Equation (6–10) one obtains for the transmission gain $L_{uvdeg}$ of the degenerated amplifier, according to Equation (4–9),:

$$L_{uvdeg.}=\frac{16G_s^2G_D^2}{[G_s+G_C+G_D]^4[1-\beta]^2\left|1-\beta e^{-j2\left(\text{arc cotg}\beta-\frac{\pi}{4}\right)}\right|^2} \qquad (6\text{–}11)$$

and with arc cotg $\beta\approx\pi/4$ for $\beta$ values in the vicinity of one:

$$L_{uvdeg.}\approx16G_s^2\,G_D^2/[G_s+G_C+G_D]^4[1-\beta]^4 \qquad (6\text{–}12)$$

The improvement which is thus obtained by the coherent phase operation is expressed by the ratio $V$ of the transmission gains between the degenerated and the quasi-degenerated case as:

$$V=L_{uvdeg.}L_{uvquasi.}=/L(1-\beta^2)^4/(1-\beta)^4=(1+\beta)^4 \qquad (6\text{–}13)$$

according to Equations (4–10) and (6–12). For high amplifications with $\beta\to1$ the improvement obtained is $V=16\equiv12$ db.

The Noise Factor of the Degenerated Amplifier

When calculating the noise behavior of the degenerated amplifier, case should be taken that noise signals be amplified without correlation, useful signals, however, with correlation, The usual methods which consider only the noise contributions are thus of no use. One must start with the definition equation of the noise factor $F_{deg.}$ which is based on the ratio of the signal to noise intervals of the degenerated amplifier at the input and output of the amplifier.

It thus applies that:

$$F_{deg.}=(P_{s,1}/P_{r,1})/(P_{s,2}/P_{r,2})=(P_{s,1}\cdot P_{r,2})/(P_{s,2}\cdot P_{r,1}) \qquad (6\text{–}14)$$

where $$\frac{P_{r,2}}{P_{r,1}}=\frac{|i_{tot}|^2L_{uvquasi}}{|i_s|}=F_{quasi}\,L_{uvquasi} \qquad (6\text{–}15)$$

represents the ratio of the energy of the uncorrelated noise signals at the output and input.

The transmission of the energy of the correlated useful signals is given, however, by the relationship:

$$P_{s,1}/P_{s,2}=1/L_{uvdeg.} \qquad (6\text{–}16)$$

From Equations (6–14), (6–15) and (6–16) one then obtains the following relation for the noise factor of the degenerated amplifier:

$$F_{deg.}=F_{quasi}\,L_{uvquasi}/L_{uvdeg.}=F_{quasi}/V \qquad (6\text{–}17)$$

Taking $F_{quasi}$ according to Equation (5–11) and $V$ according to Equation (6–13) it then follows:

$$F_{deg.}=\frac{1+\beta^2}{(1+\beta)^4}+\frac{1}{3}\frac{G_D}{G_s(1+\beta)^4}\left[1-\frac{1}{2}\left(1+\frac{G_s}{G_D}\right)(1-\beta^2)\right]^2 \quad (6\text{–}18)$$

According to Equation (6–18), the noise factor of the degenerated amplifier has thus become smaller by the factor $V=(1+\beta)^4$ than the noise factor of the quasidegenerated amplifier.

The signal to noise ratio at the output of the amplifier in the coherent phase operation is thus substantially improved compared to the signal to noise ratio at the input of the amplifier. For high amplification with $\delta \rightarrow |$ and for $G_D < G_s$ the following results from equation (6–18):

$$F_{deg.} \approx 1/8 \equiv -9\text{dB} \quad (6\text{–}19)$$

This means that a phase-coherent receiver circuit designed according to the present invention is particularly suited for communications transmission with space vehicles becuase here the sensitivity of the receiver is of a decisive importance for the range and dependability of the communications transmission.

It will be understood that the above description of the present invention is susceptible to various modifications, changes and adaptations, and the same are intended to be comprehended within the meaning and range of equivalents of the appended claims.

I claim:

1. In a coherent phase receiver circuit composed of a parametric preamplifier having an input to which the input signal to the circuit is applied, a voltage-controlled oscillator, a phase detector responsive to the output signals from said preamplifier and said oscillator for forming the difference between the phase of the input signal to the circuit and the phase of the reference signal produced by the voltage-controlled oscillator, a control filter connected to feed a signal representing the phase difference to said oscillator to adjust the oscillator output, and a frequency multiplier responsive to the output signal from said oscillator and having its output connected to said parametric preamplifier to supply a pump signal to said parametric preamplifier from the output of the voltage-controlled oscillator, the improvement wherein: said parametric preamplifier is nonreciprocal and comprises a series connection of an upconverter and a downconverter each having a diode controlled by the pump frequency signal from said frequency multiplier at a respectively different phase, and means for neutralizing the feedback admittance of said preamplifier; the frequency of the pump signal is equal to twice the frequency of the input signal to the circuit; and said frequency multiplier is a frequency doubler.

* * * * *